INVENTORS
CARL W. SCHOLL
MILO L. RAFFAELLI, SR.

BY
ATTORNEYS

United States Patent Office 3,528,872
Patented Sept. 15, 1970

3,528,872
HEAT SEALED ARTICLE WITH BACKING
Carl W. Scholl and Milo L. Raffaelli, Sr., Chicago, Ill., assignors to The Scholl Mfg. Co., Inc., Chicago, Ill., a corporation of New York
Filed Jan. 4, 1967, Ser. No. 607,246
Int. Cl. B32b 1/04; B29c 19/04
U.S. Cl. 161—44
2 Claims

ABSTRACT OF THE DISCLOSURE

An article having a thermoplastic cover secured to a backing member by electronic heat sealing, there being cushioning means between the cover and backing member in most instances, and the backing member being of fiberboard impregnated with latex or equivalent material to render the same elastomeric, leather in some instances, or any other suitable substance depending upon the intended use of the article.

BACKGROUND OF THE INVENTION

The instant invention, made in various shapes and sizes, will have numerous uses. The invention consists mainly in the provision of a panel-like article having a reinforcing backing member over one face of which is attached a thermoplastic cover, there usually being cushioning means between the thermoplastic cover and the backing member, and the thermoplastic cover being heat sealed to the backing member. The exposed face of the backing member is then utilized to attach the panel-like device to whatever surface it is desired to cover, by adhesive means or otherwise. In the instant invention the backing member is covered completely over the upper face thereof and completely over the bounding edge thereof, leaving only the underface of the backing member exposed, thus the backing member is completely waterproofed except for the face thereof to be attached to the surface to be covered.

Heretofore, a thermoplastic cover, with cushioning means at times between the cover and the backing member, was attached by electronic heat sealing to the upper face only of the backing member, which usually was fiberboard impregnated with latex or other material to render the same elastomeric. A film of vinyl, acetate or other heat sealable plastic was placed upon the surrounding upper margin of the backing member so that the thermoplastic cover could be heat sealed thereto. When the device was complete, however, the bounding edge of the backing member which was at right angles to the upper and lower faces thereof was completely exposed, and it was esential to color that edge in keeping with the color of the cover member. This is particularly true where the resultant device was used as an insole for footwear and especially with sandals wherein the exposed edge of the cover member would be obnoxiously visible if not painted in accordance with the color of the cover. However, painting did not solve the waterproofing problem, and water would frequently delaminate or cause other deterioration of the backing member.

SUMMARY

The invention or discovery relates to a panel-like device of the character above mentioned wherein the problem presented by the prior art, as explained above, is simply and effectively cured by the cover being heat sealed over and to the edge of the backing member so as to completely enclose the upper face and edge of the backing member leaving only the rear face or attaching side of the back member exposed. With the instant invention the backing member is fully protected from water or other moisture if it is properly mounted in place on the desired surface to be covered. All necessity of painting or otherwise coloring the backing member to match the cover is entirely eliminated, adding materially to the economy of manufacture and the end result is a far better and more attractive product.

Figure 4:
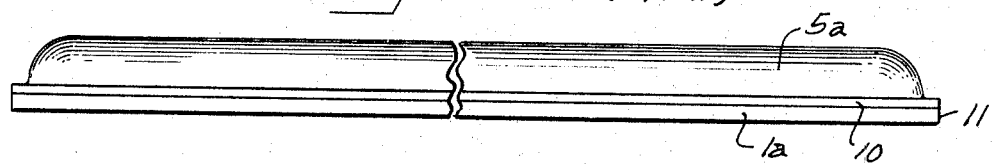
Figure 5:
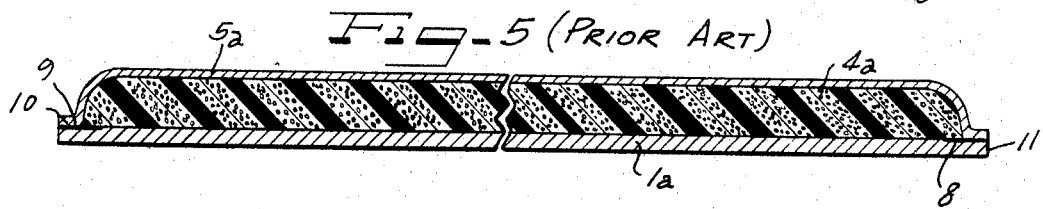
Figure 6:
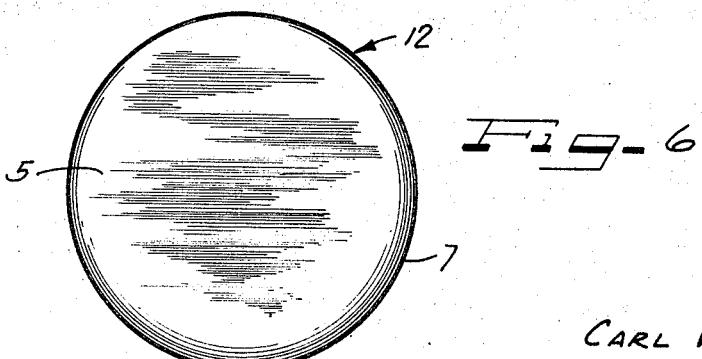

FIGS. 4 and 5 are respectfully a fragmentary side elevational view and a fragmentary vertical sectional view of a prior art construction utilized herein to better show the advance in the art by way of the instant invention; and FIG. 6 is a plan view of a heat sealed article of different shape but embodying principles of the instant invention, the structure of FIG. 6 being highly desirable for use as a stool seat.

The preferred form of the instant invention may be made in various shapes and sizes and various thicknesses dependent upon the intended one of its various uses including insoles for footwear especially shoes and sandals, wall panels, stool and chair seats and backs, vehicle interior panels, and many others. Other than such variation determined by intended usage, the construction of the heat sealed articles embodying this invention is generally the same.

Figure 1:
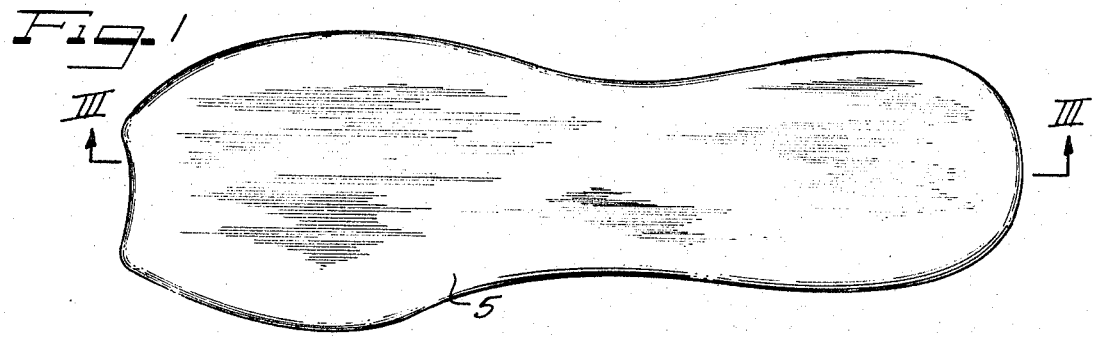
FIG. 1 is a plan view of a heat sealed article with backing, embodying principles of the instant invention and shown in the form of an insole for an article of footwear.
Figure 2:
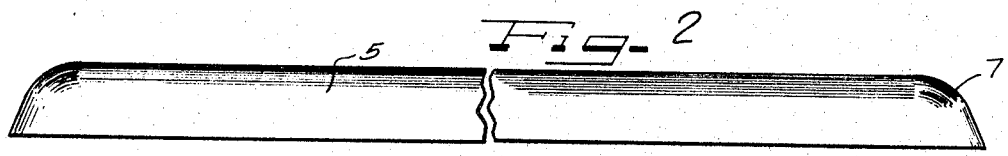
FIG. 2 is a greatly enlarged fragmentary elevational view of the structure of FIG. 1.
Figure 3:
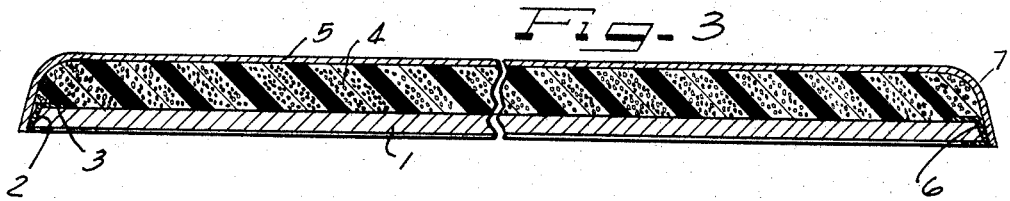
FIG. 3 is a vertical longitudinal section taken substantially as indicated by the line III–III of FIG. 1 looking in the direction of the arrows.

That illustrated embodiment of the instant invention seen in FIGS. 1, 2 and 3 is in the form of a cushion-type insole for shoes, sandals, and the like. The heat sealed article comprises a precut backing member 1 which, in this instance of usage, could be leather or other suitable material, is preferably fiberboard impregnated with latex or any other suitable substance to render it elastomeric so that it will not cup, harden, crack, or lose its shape during usage. The upper and lower faces of the member 1 are both preferably flat and parallel and the bounding or side edge of the backing member is preferably sloping or bevelled as indicated at 2, for the purpose of facilitating the heat sealing of the cover thereto in one simple operation in a press equipped with electronic heat sealing means. It has been found by experience that a highly satisfactory bevel angle is a slope of approximately 24° from the vertical. The bounding margin of the backing member is provided with a film 3 of a heat sealable plastic material such as vinyl, acetate, or the equivalent, and this may be applied by painting, spraying, or dipping, as may be desired. That portion of the film underlying the backing member is by no means essential but is merely precautionary to insure that the entire side edge 2 is covered with film. This film is virtually invisible and of minimal thickness, it being shown in FIG. 3 grossly exaggerated for purposes of illustration.

Since this form of the invention is a cushioning device, a layer 4 of cushioning material which is preferably a thermoplastic foam overlies the backing member 1. This foam material may be any synthetic foam that is heat sealable with the aid of ultrahigh frequency heat sealing means, such as a vinyl, urethane, urethane impregnated with vinyl, or equivalent foam. Such foam is highly durable, has considerable restorative power, is fungus-proof, and has many other attributes.

Disposed over the foam layer is a cover 5, considerably thinner than the foam layer, and which is composed of electronically heat sealable material. An excellent material for this purpose is an expanded vinyl sheet which is softer, yet tougher and more endurable than ordinary vinyl sheeting, and which provides a very comfortable feel to the foot and has a most attractive texture and appearance. The cover 5 may be provided in substantially any desired color.

The sheets 4 and 5 may be in the form of a laminate with the sheet 5 cemented to or cured on the foam sheet during manufacture, or they may be separate. Each has an individual advantage in manufacture depending upon conditions. For example, the laminate form may be utilized when many articles of the same color are to be manufactured, resulting in great convenience in handling. On the other hand, where special orders are being filled, it may be preferred to have the sheets 4 and 5 separate so that only one color of foam material 4 need be stocked while the much thinner cover sheets 5 may be stocked in various colors, thus reducing the inventory and storage space.

In either event, whether separate sheets or a laminate is used they are in the form of stock sheets of indefinite size, since the heat seal seam is both a heat and tear seal seam and the wastage stock is easily removed. With the aid of a suitable die having an interior slope which is the counterpart of the bevelled edge 2 on the backing member the parts are united with a single movement of the die and a very short charge of ultrahigh frequency electricity through the die. The heat seal seam 6, FIG. 3, effectively joins the cover to the backing member, the seam occurring partially on the upper face of the backing member but entirely over the bevelled edge of the backing member the cover and possibly a portion of the foam layer being compressed and heat sealed together and to the entire face of the bevelled edge. The heat seal seam also provides a smooth and pleasantly appearing curvature 7 immediately above the seam. During the heat sealing operation the cover does not flow under a backing member 1 but does extend entirely over the bevelled edge of the backing member and may thicken at the bottom edge very slightly.

To better illustrate the advantages of the instant invention, we have shown a sample of a structure used prior to the instant invention in FIGS. 4 and 5. In this instance, a backing member 1a, which may be the same as the backing member 1 above described, was utilized, as was a foam cushioning layer 4a and an electronically sealable cover layer 5a. The upper margin of the backing member was given a stripe of vinyl or acetate as indicated at 8 in FIG. 5. The cover was heat sealed to the backing member by virtue of this heat sealable stripe 8. The heat seal seam occurred as indicated at 9 on the upper face only of the backing member and the cover extended slightly horizontally at the heat seal seam, as indicated at 10, giving somewhat the appearance of a welt. The backing member was a plain stamping, the edge 11 thereof at right angles to the upper and lower faces, and this edge 11 was left exposed after the heat sealing operation. It was therefore essential that the edge 11 be painted or otherwise colored in keeping with the color of the cover 5a, but regardless of the care expended it was impossible, in substantially every case, to acquire an exact color match. Therefore, to some extent the raw edge 11 of the backing member was still visible. In addition when a structure of this kind was used as an insole in a sandal the edge 11, regardless of having been colored, was subject to injurious moisture and in many cases would ultimately delaminate and accumulate dirt which could not be removed. Also, it will be noted that the structure of FIGS. 4 and 5 does not have the smooth clean appearance with an even curvate edge clear to the bottom of the backing member that is so desirable in an article of footwear, in paneling, in stool and chair seats and backs, and the many other places where the instant invention is useful.

With the instant invention, a desired appearance is present, the operation of coloring the edge of the backing member is totally eliminated and the back member is fully protected against the adverse effects of moisture such as water and perspiration.

In FIG. 6 we have illustrated a stool seat cover, generally indicated by numeral 12, and embodying the same features of the instant invention as above described, to illustrate clearly that the instant invention may be made in substantially any desired shape. The seat or seat cover 12 has the same character of top cover 5 and has the same attractive appearing rounded corner 7, and it also embodies a backing member fully enclosed except for the underface thereof as above described in connection with FIGS. 1, 2 and 3. By the same token, the instant invention may be made in a shape satisfactory for many other uses.

It will be understood that modifications and variations may be effected without departing from the scope of the novel concepts of the present invention.

We claim as our invention:

1. A panel-like article comprising a backing member defined by a marginal edge extending between opposite faces of said member, said edge being provided with heat sealable plastic material, and a sheet of soft thermoplastic cover material overlying one face of said backing member and terminating at the juncture of said marginal edge and the opposite face of said backing member, wherein said marginal edge is bevelled outwardly from said covered face to said opposite face of said backing member, a layer of thermoplastic foam material is placed between said cover material and said backing member, the cover material is heat sealed to said marginal edge and presents a smooth pleasing curvature around the edge of said backing member with no interruption in the smooth contour of the cover material over its entire surface.

2. The article in accordance with claim 1 in which the cover material is electronically heat sealable material and it is electronically heat sealed to said marginal edge.

References Cited

UNITED STATES PATENTS

| | | | |
|---|---|---|---|
| 1,824,537 | 9/1931 | De Correvont | 161—44 |
| 2,184,140 | 12/1939 | Cunnington | 161—43 |
| 2,725,923 | 12/1955 | Bach/rach | 297—461 |

DOUGLAS J. DRUMMOND, Primary Examiner

U.S. Cl. X.R.

156—273; 161—149, 161